US008235453B2

(12) United States Patent
Hull, Jr.

(10) Patent No.: US 8,235,453 B2
(45) Date of Patent: Aug. 7, 2012

(54) VEHICLE SLIDE DOOR ALIGNMENT SYSTEM

(75) Inventor: James Allen Hull, Jr., Marysville, OH (US)

(73) Assignee: Honda Motor Co., Ltd, Tokyo (JP)

( * ) Notice: Subject to any disclaimer, the term of this patent is extended or adjusted under 35 U.S.C. 154(b) by 224 days.

(21) Appl. No.: 12/557,996

(22) Filed: Sep. 11, 2009

(65) Prior Publication Data

US 2011/0061306 A1 Mar. 17, 2011

(51) Int. Cl.
*B60J 5/06* (2006.01)

(52) U.S. Cl. .................................... 296/155; 296/146.9

(58) Field of Classification Search .................. 296/155, 296/146.9

See application file for complete search history.

(56) References Cited

U.S. PATENT DOCUMENTS

| | | | |
|---|---|---|---|
| 3,595,178 A | 7/1971 | Dahlen | |
| 4,084,289 A | 4/1978 | Naimo | |
| 4,152,872 A | 5/1979 | Tanizaki et al. | |
| 4,192,039 A | 3/1980 | Haberle et al. | |
| 4,433,507 A | 2/1984 | Chikaraishi | |
| 4,560,197 A | 12/1985 | Minami | |
| 4,753,039 A | 6/1988 | Jeuffray et al. | |
| 4,869,544 A | 9/1989 | Anwyll et al. | |
| 5,070,575 A | 12/1991 | Redman et al. | |
| 5,626,384 A | 5/1997 | Walther | |
| 5,791,723 A | 8/1998 | Bell et al. | |
| 5,876,103 A * | 3/1999 | Domenig | 312/334.4 |
| 5,934,022 A | 8/1999 | Faubert | |
| 5,967,595 A | 10/1999 | Heya et al. | |
| 6,206,455 B1 | 3/2001 | Faubert et al. | |
| 6,401,396 B1 | 6/2002 | Koban et al. | |
| 6,926,342 B2 * | 8/2005 | Pommeret et al. | 296/155 |
| 7,337,581 B2 | 3/2008 | Kriese | |
| 7,350,335 B2 | 4/2008 | Suzuki | |
| 7,360,824 B2 | 4/2008 | Nakayama et al. | |
| 7,390,054 B2 | 6/2008 | Suzuki | |
| 7,900,987 B2 * | 3/2011 | Seeg | 296/24.4 |

FOREIGN PATENT DOCUMENTS

| | | |
|---|---|---|
| GB | 2261011 A | 5/1993 |

* cited by examiner

*Primary Examiner* — Glenn Dayoan
*Assistant Examiner* — Melissa A Black
(74) *Attorney, Agent, or Firm* — James R. Eley; Michael A. Forhan; Eley Law Firm Co. LPA

(57) ABSTRACT

A system for aligning a slide door of a vehicle. A pair of locating features, each having a male part and a female part, are attached to a surface of a pillar of the vehicle and to a surface of the door. A rail is attached to the body, the rail having a non-flared portion and a flared portion. A wheel attached to the door is movable along the rail. The wheel is laterally constrained in the non-flared portion of the rail when the door is in an open condition and are laterally movable in the flared portions of the rail when the door is proximate a closed condition. A projecting portion of the male part mates with a receptacle of the female part when the slide door is closed, laterally adjusting and aligning the door with respect to the outer body panel.

20 Claims, 5 Drawing Sheets

VEHICLE SLIDE DOOR ALIGNMENT SYSTEM

FIELD

The present invention relates generally to sliding doors for vehicles, in particular to an alignment system for a vehicle sliding door.

BACKGROUND

Automotive vehicles, particularly van type vehicles, commonly have a slide door for alternately covering and uncovering an entrance opening. The entrance opening is typically on a side of the vehicle and the door slides in a rearward direction on a set of guide rails to a position slightly outward of an outer body surface of the vehicle to uncover the entrance opening. The slide door is moved in a forward direction and latches to a B-pillar in a closed position to cover the entrance opening.

The position of a slide door with respect to the body of the vehicle is typically controlled by the guide rail, which is attached to the body. The door is coupled to the guide rail with a set of guide rollers and moves slidably along the rail between an open position and a closed position. In order to achieve a desirable fit and finish of the door-to-body interface it is necessary to closely control the interfacing tolerances of the aforementioned components. Close-tolerance components are relatively expensive, adding to the overall cost of the vehicle. The labor required to install and adjust the components for the desired fit and finish is also greater than is desirable.

SUMMARY

A vehicle slide door to body interface is disclosed according to an embodiment of the present invention. The slide door to body interface includes a projecting member attached to the door and a receptacle attached to the body for receiving the member. The receptacle provides a fixed spacial reference or "datum point" for the sliding door with respect to an outer body panel of the vehicle. A guide rail is attached to the body, and the slide door is coupled to the guide rail with guide rollers. The guide rail includes a flared portion in the region of the locations of the guide rollers when the door is approaching a closed condition. The flared portion permits controlled vertical movement of the door within the guide rail as the projecting member engages the receptacle during closure of the door, thereby allowing the door to move to its previously determined proper closed position.

An exemplary embodiment of the present disclosure includes a system for aligning a slide door of a vehicle with respect to an outer panel of a body of the vehicle. At least one male part has a projecting portion and at least one corresponding female part has a receptacle, one of the parts being attached to a surface of a pillar of the vehicle at a predetermined spacial datum referenced to the outer body panel and the other of the parts being attached to a surface of the door. An elongated rail is attached to the body, the rail having a longitudinal channel with a non-flared portion and a flared portion. A wheel attached to the door is rotatably movable along the channel of the rail, the wheel being laterally constrained in the non-flared channel portion of the rail when the door is in an open condition and being laterally movable in the flared channel portion of the rail when the door is proximate a closed condition. The door is laterally adjustable proximate the closed condition by lateral movement of the wheel. The projecting portion of the male part mates with the receptacle of the corresponding female part when the slide door is closed, laterally adjusting and aligning the door with respect to the outer body panel.

Another embodiment of the present disclosure includes a system for aligning a slide door of a vehicle with respect to an outer panel of a body of the vehicle. The system comprises at least one male part having a projecting portion and at least one corresponding female part having a receptacle, one of the parts being attached to a surface of a pillar of the vehicle at a predetermined spacial datum referenced to the outer body panel and the other of the parts being attached to a surface of the door. A first elongated rail is attached to the body, the first rail having a longitudinal channel with a non-flared portion and a flared portion. A first wheel is attached to the door and is rotatably movable along the channel of the first rail. The first wheel is laterally constrained in the non-flared channel portion of the first rail when the door is in an open condition and is laterally movable in the flared channel portion of the first rail when the door is proximate a closed condition. A second elongated rail is attached to the body, the second rail having a longitudinal channel with a non-flared portion and a flared portion; A second wheel is attached to the door and is rotatably movable along the channel of the second rail. The second wheel is laterally constrained in the non-flared channel portion of the second rail when the door is in the open condition and is laterally movable in the flared channel portion of the second rail when the door is proximate the closed condition. The door is laterally adjustable proximate the closed condition by lateral movement of the wheels. The projecting portion of the male part mates with the receptacle of the corresponding female part when the slide door is closed, laterally adjusting and aligning the door with respect to the outer body panel.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
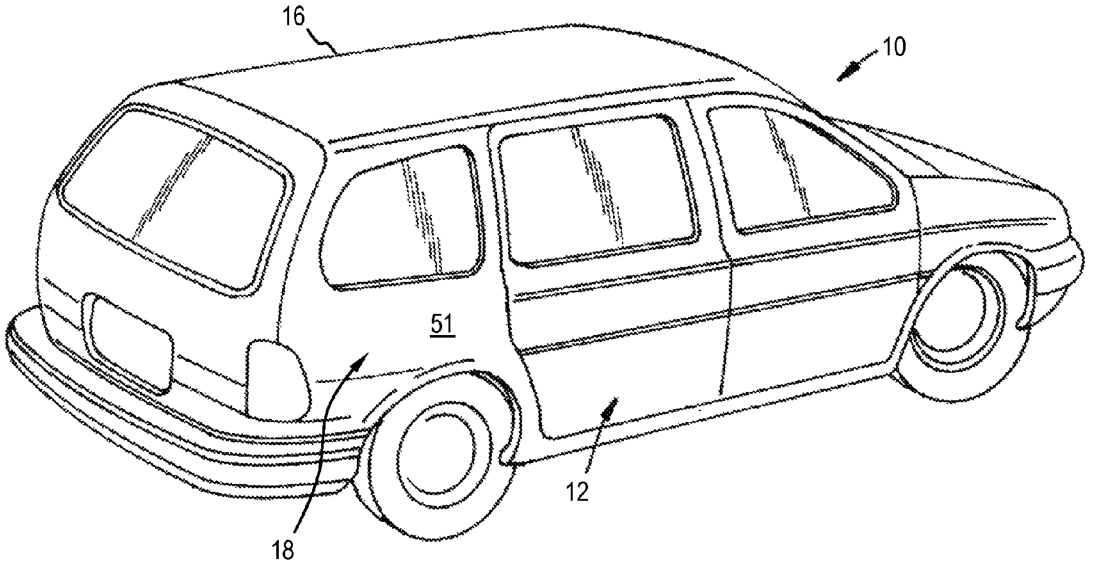
FIG. 1 is a perspective view of a vehicle having a slide door in a closed position.
Figure 2:
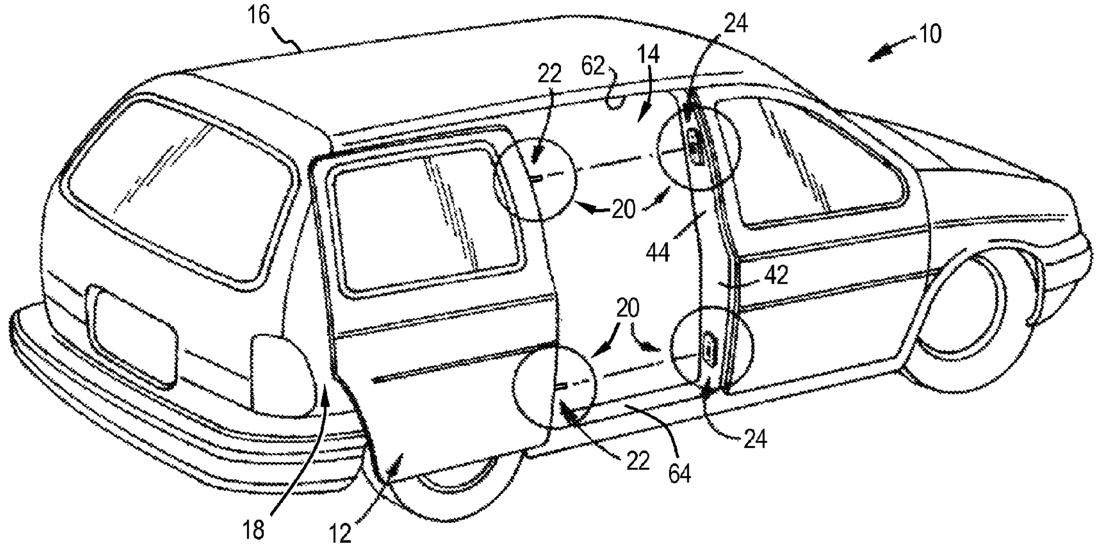
FIG. 2 is a perspective view of the vehicle of FIG. 1 with the slide door in an open position, and equipped with a slide door alignment system according to an embodiment of the present invention.
Figure 3:
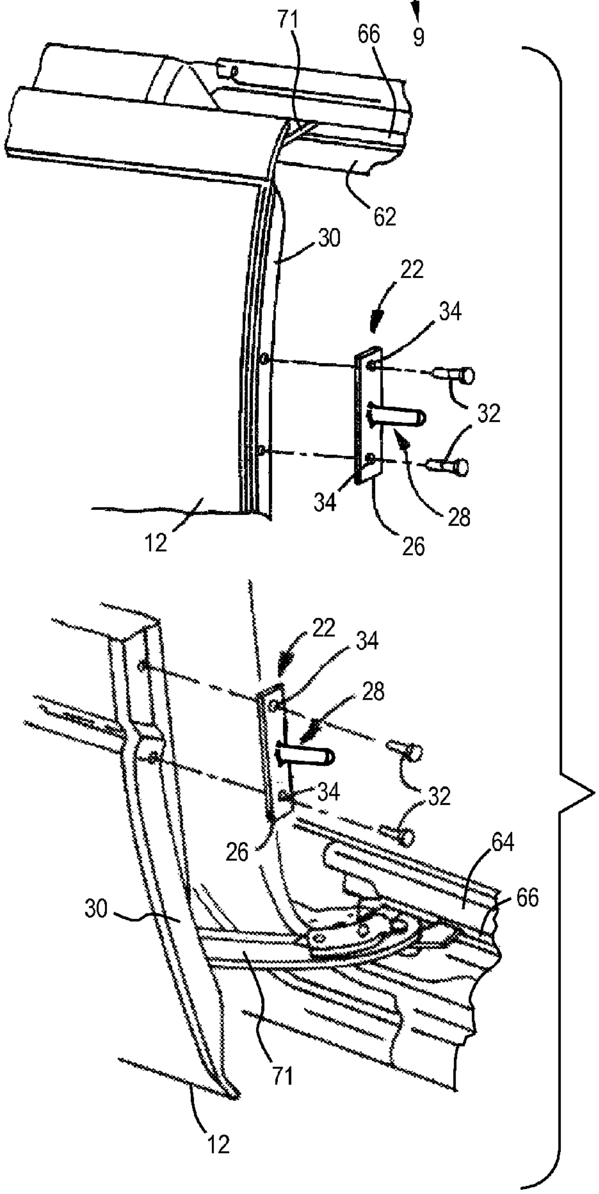
FIG. 3 is an exploded fragmentary perspective view showing the male parts of the system mounted to the slide door.
Figure 4:
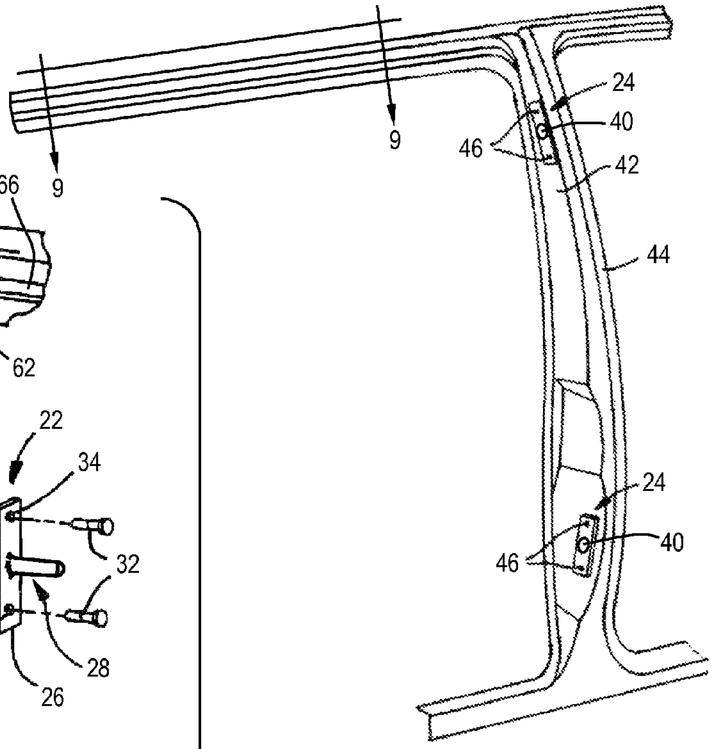
FIG. 4 is a fragmentary perspective view showing the female parts of the system mounted on a door pillar.
Figure 5:
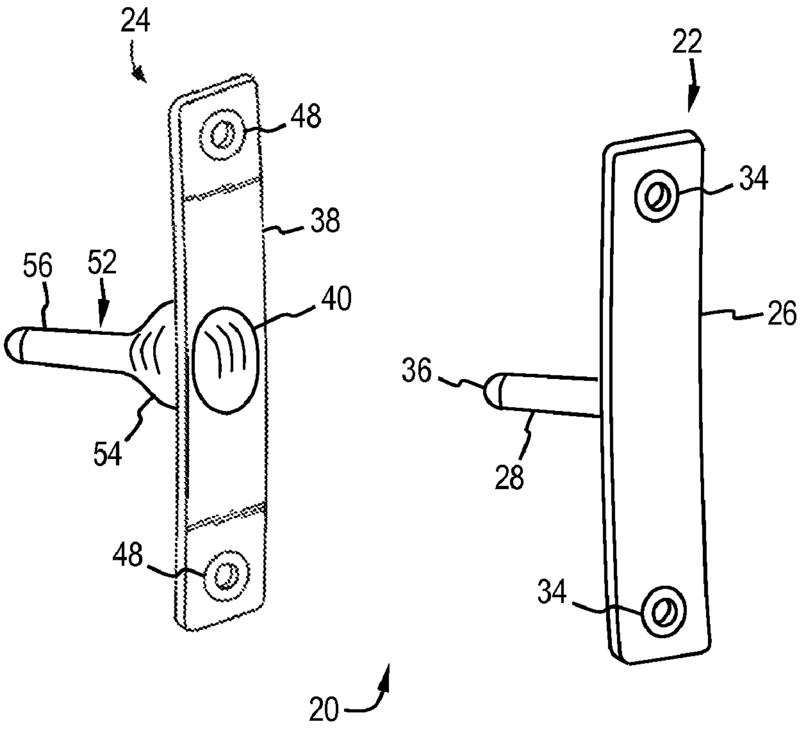
FIG. 5 is a perspective view showing the two parts of the locating feature prior to engagement.
Figure 6:
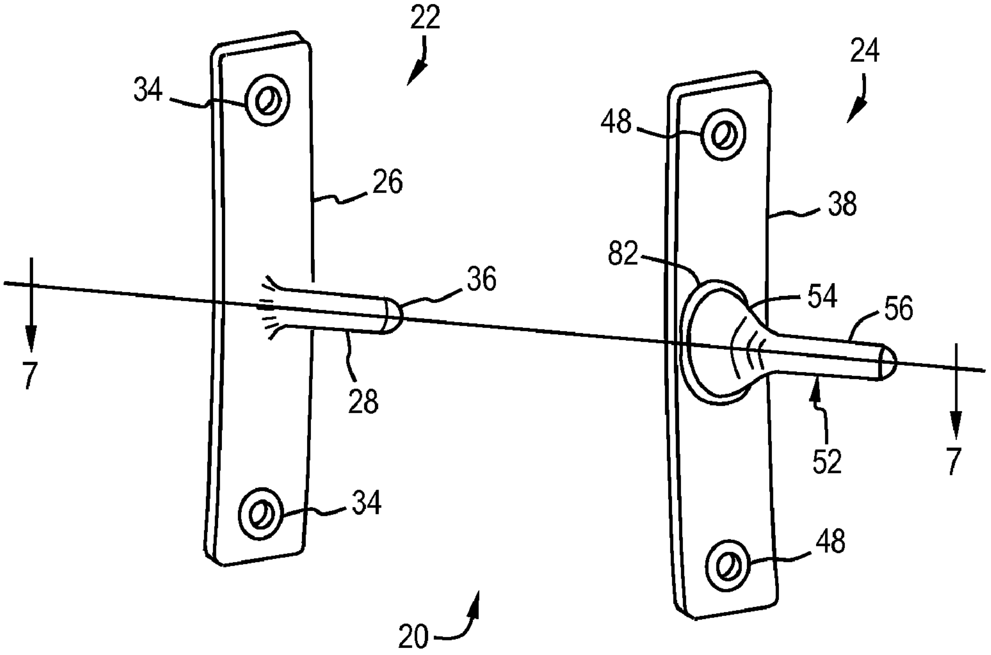
FIG. 6 is a view similar to FIG. 5 but showing the parts as seen from the opposite side.

A vehicle 10 having a horizontal sliding door 12 that selectably closes off an opening 14 in a body 16 of the vehicle is shown in FIGS. 1 and 2 according to an embodiment of the present invention. The opening and closing operation of door 12 is performed by sliding the door along a side wall 18 of the vehicle. Vehicle 10 includes least one and preferably, as in this case, two locating features 20, each having a male part 22 and a female part 24. Locating features 20 ensure that door 12, when closed, is properly aligned with respect to an outer panel of body 16.

Details of male part 22 are shown in FIGS. 3, 5, 6, 7 and 8. Male part 22 has a mounting portion in the form of an elongated, generally rectangular flat plate 26 and a projecting portion 28 that is integral with or attached to the plate. Male part 22 is secured to a generally vertical side edge portion 30 of door 12 by fasteners 32 extending through openings 34 in the upper and lower end portions of plate 26 to secure the plate in a generally vertical or upright position. The projecting portion 28 is cylindrical in shape with a generally constant diameter and extends outwardly from a mid-point of the plate 26 to its outer free edge or tip 36, which is rounded.

Male part 22 may be made from any material suitable for use with vehicle 10 and the expected environment including, without limitation, metal, plastic and composites. In addition, the various components of male part 22 may be formed in any conventional manner including, without limitation, casting, machining, forming, molding and stamping. Furthermore, male part 22 may be finished in any conventional manner, such as painting, coating or plating, or may be left unfinished.

Details of female part 24 are shown in FIGS. 4, 5, 6, 7 and 8. Female part 24 has a mounting portion in the form of an elongated generally rectangular flat plate 38 and a receptacle 40 that is integral with or attached to the plate 38. Female part 24 is secured to a wall 42 of a generally vertical pillar 44 of the vehicle body, in this case the "B" pillar, by fasteners 46 extending through openings 48 in the upper and lower end portions of the plate 26 to secure the plate in a generally upright position, with receptacle 40 extending into pillar 44 through an opening 50 in wall 42. The location of female part is preferably closely controlled with respect to wall 42, pillar 44 and an outer panel 51 (FIG. 1) of body side wall 18, the location serving as a datum feature for the position of door 12 in the closed condition.

Figure 7:
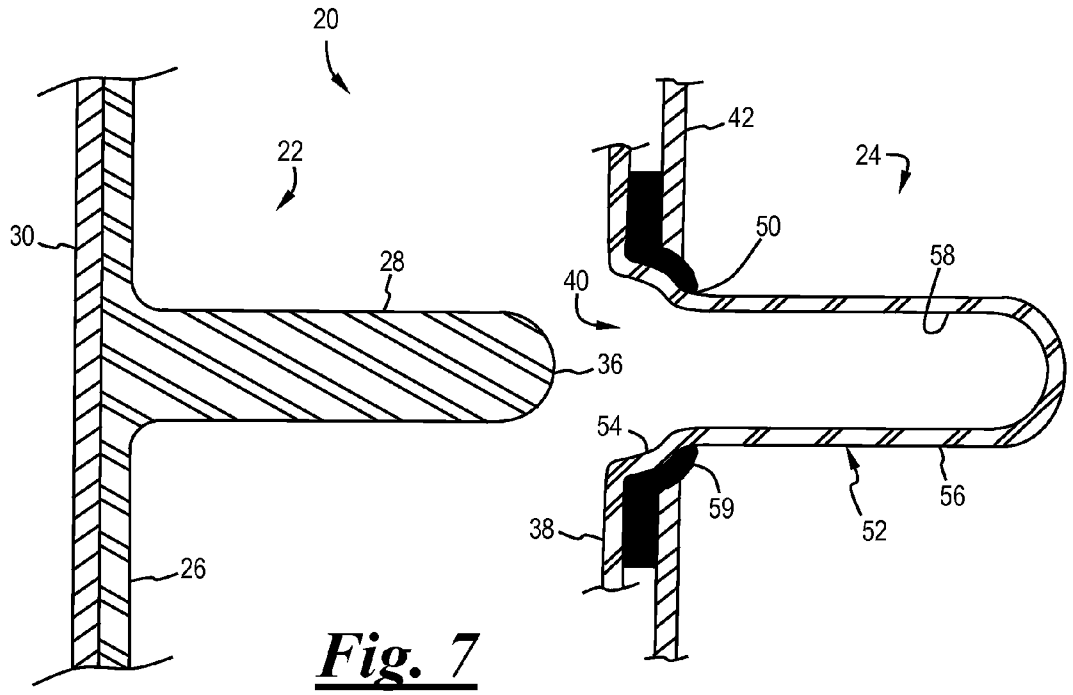
FIG. 7 is a view taken along the line 7-7 in FIG. 6 with the parts mounted to the body of the vehicle.
Figure 8:
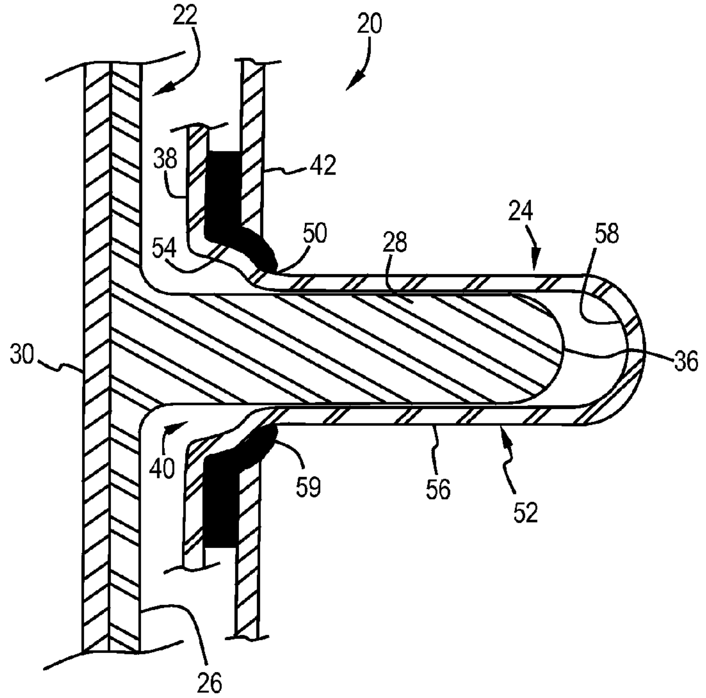
FIG. 8 is a view similar to FIG. 7 but showing the two parts of the locating feature in engagement with one another.
Figure 9:
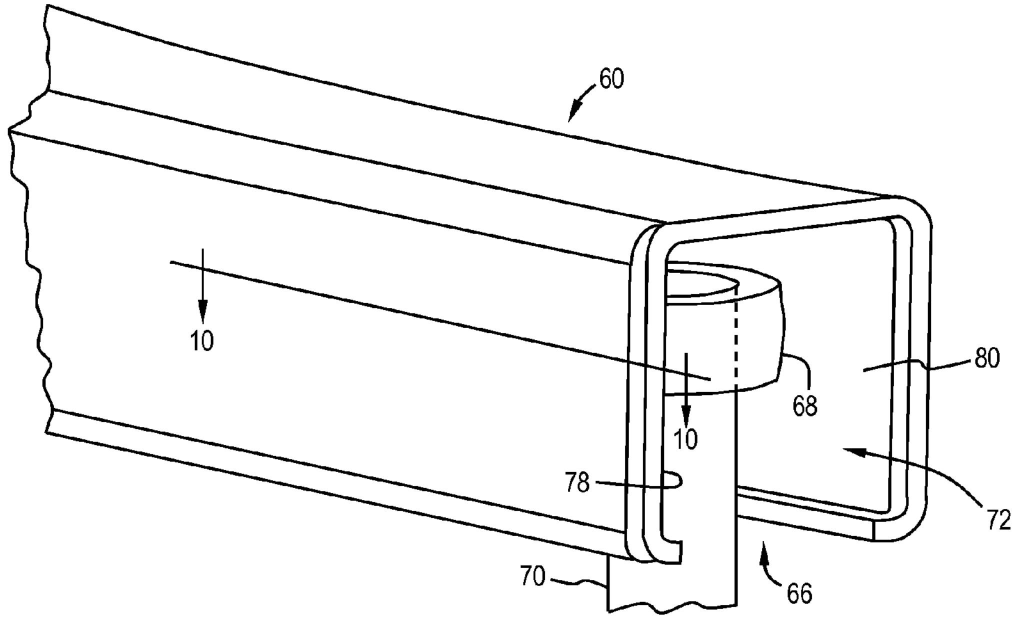
FIG. 9 is a fragmentary perspective view showing a rail and a wheel of the system.

Receptacle 40 is in the form of a generally cylindrical pocket 52 which extends into the hollow interior of the pillar 44. Pocket 52 has a tapered guiding portion 54 and a non-tapered portion 56. An inner surface 58 of the non-tapered portion 56 is sized and shaped to closely fit projecting portion 28 of male part 22. The male and female parts 22, 24 respectively are inclined at the same angle as shown in FIGS. 7 and 8 so as to be aligned with the path of door 12 in the final stage of its movement to a closed position.

Female part 24 may be made from any material suitable for use with vehicle 10 and the expected environment including, without limitation, metal, plastic and composites. In addition, the various components of female part 24 may be formed in any conventional manner including, without limitation, casting, machining, forming, molding and stamping. Furthermore, female part 24 may be finished in any conventional manner, such as painting, coating or plating, or may be left unfinished.

In some embodiments of the present invention female part 24 may be directly attached to pillar wall 42. Alternatively, a seal 59 may be interposed between female part 24 and pillar wall 42, as shown in FIGS. 7 and 8.

An elongated rail 60 for use with vehicle 10 is shown in FIGS. 2, 3, 9 and 10. A pair of rails 60 are attached to body 16 of vehicle 10, a first rail forming an upper rail 62 proximate a top portion of door 12 and a second rail forming a lower rail 64 proximate a middle or bottom portion of the door. An open side 66 of each of the upper and lower rails is oriented to face toward door 12. One or more wheels 68 are ultimately attached to an upper portion of door 12 with an axle 70 and are slidably disposed in a channel 72 of upper rail 62, the axle extending through open side 66 of the upper rail. Likewise, one or more wheels 68 are attached to a lower portion of door 12 with an axle 70 and are slidably disposed in a channel 72 of lower rail 64, the axle extending through open side 66 of the lower rail. Mounting hardware 71 (FIG. 3), such as brackets, levers and arms, may be interposed between axle 70 and door 12 as appropriate for a particular vehicle 10.

Figure 10:
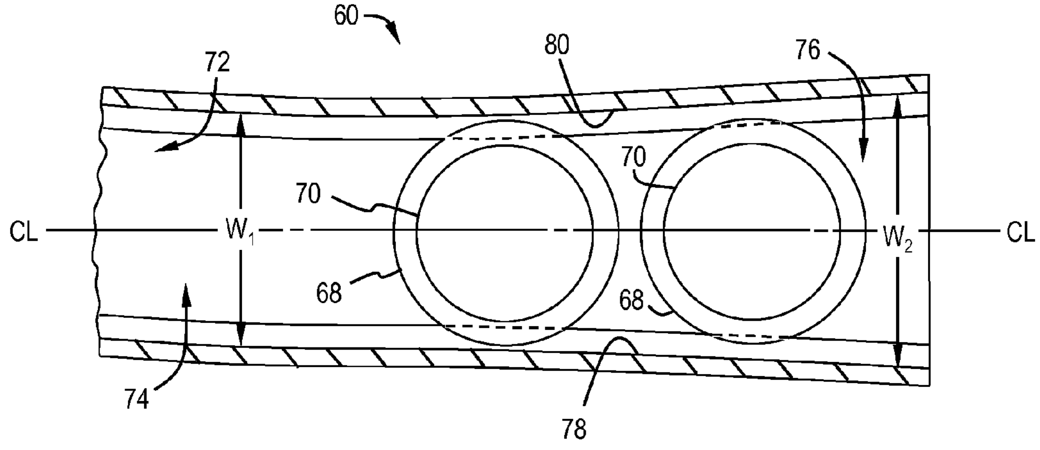
FIG. 10 is a view taken along the line 10-10 in FIG. 9.

With reference to FIGS. 1, 2, 9 and 10, channel 72 of rail 60 further includes a non-flared portion 74 and an outwardly flared portion 76. Non-flared portion 74 has a predetermined, relatively constant width $W_1$, while flared portion 76 extends from non-flared portion to a slightly greater predetermined width $W_2$ at an end of rail 60. Stated another way, channel 72 gradually tapers from width $W_2$ to width $W_1$, as shown in FIG. 10, opposing side walls 78, 80 of the channel being symmetrically tapered with respect to a centerline "CL" of the channel. Rail 60 is constructed such that the width of rail channel 72 is approximately $W_1$ to limit movement of wheel 68 between opposing side walls 78, 80 of the rail when door 12 is in an open position, while still allowing the wheel to move freely along the longitudinal length of the rail. The width of the rail channel is approximately $W_2$ when the door is approaching or has reached a closed position, thereby allowing for lateral movement of wheels 68 between side walls 78, 80 while also allowing the wheel to move freely along the longitudinal length of the rail.

Rails 60 may be made from any material suitable for use with vehicle 10 and the expected environment including, without limitation, metal, plastic and composites. In addition, the various components of rails 60 may be formed in any conventional manner including, without limitation, casting, machining, forming, molding and stamping. Furthermore, rails 60 may be finished in any conventional manner, such as painting, coating or plating, or may be left unfinished.

With reference to FIGS. 1 through 10 together, in operation door 12 is opened by actuating a door handle and urging the door away from pillar 44. Wheels 68 move rollably or slidably along the longitudinal length of rails 62, 64 and within channels 72, lateral movement of the wheels being limited by the width $W_1$ of the channels and the rails providing support for the door as it moves away from opening 14 of the vehicle body. When door 12 is in the fully open position male part 22 is adjacent to side wall 18 of the vehicle body and does not obstruct body opening 14.

When door 12 is to be closed the door is urged toward pillar 44. Wheels 68 move rollably or slidably along the longitudinal length of rails 62, 64 and within channels 72, lateral movement of the wheels being limited by the width $W_1$ of the channels and the rails providing support for the door as it moves into opening 14 of the vehicle body. As door 12 approaches the closed position wheels 68 are allowed a predetermined amount of lateral movement, defined by width $W_2$ of channel 72 (FIG. 10). In addition, male part 22 approaches female part 24 (FIG. 7). As door 12 nears the closed position projecting portion 28 of male part 22 engages receptacle 40 of female part 24, being guided by tapered portion 54. Door 12 and, in turn, projecting portion 28 is permitted a predetermined amount of lateral movement due to the lateral movement allowed wheels 68 within width $W_2$ of channels 72, thus aiding the projecting portion to align with the receptacle. In the door closed position projecting portion 28 of male part 22 engages non-tapered portion 56 of receptacle 40 of female part 24 (FIG. 8). As projecting portion 28 of male part 22 engages non-tapered portion 56 of pocket 52, a force generated due to any misalignment between the projecting portion of the male part and the non-tapered portion of the female part is coupled through door 12 to upper and lower rails 62, 64. The misalignment force causes wheels 68 to move laterally within flared portions 76 of the rails, allowing door 12 to move laterally. In the final closed position door 12 is aligned to a predetermined position that is controlled by the aforementioned datum previously established for the location of female part 24.

In various embodiments of the present invention the shapes of projecting portion 28 and receptacle 40 may be modified to suit a particular vehicle. For example, the length of projecting portion 28 and the corresponding depth of receptacle 40 may be increased or decreased as desired. In addition, projecting portion 28 and receptacle 40 may be non-cylindrical shapes such as triangular, pyramidal and conical shapes, among others.

While this invention has been shown and described with respect to a detailed embodiment thereof, it will be understood by those skilled in the art that changes in form and detail thereof may be made without departing from the scope of the claims of the invention. For example, although male part 22 is shown and described herein as being mounted to door 12 and female part 24 is shown and described herein as being mounted to door pillar 44, the positions of the male and female parts may be reversed with the male part being mounted to the door pillar and the female part being mounted to the door.

What is claimed is:

1. A system for aligning a slide door of a vehicle with respect to an outer panel of a body of the vehicle, comprising:
- at least one male part having a projecting portion;
- at least one corresponding female part having a receptacle, one of the parts being attached to a surface of a pillar of the vehicle at a predetermined spacial datum referenced to the outer body panel and the other of the parts being attached to a surface of the door;
- an elongated rail attached to the body, the rail having a longitudinal channel with a non-flared portion and a flared portion, the width of the channel being gradually tapered between the flared portion and the non-flared portion, opposing sidewalls of the channel being symmetrically tapered with respect to a centerline of the channel;
- a wheel attached to the door and rotatably movable along the channel of the rail, the wheel being laterally constrained in the non-flared channel portion of the rail when the door is in an open condition and being laterally movable in the flared channel portion of the rail when the door is proximate a closed condition;
- wherein the door is laterally adjustable proximate the closed condition by lateral movement of the wheel, and
- wherein the projecting portion of the male part mates with the receptacle of the corresponding female part when the slide door is closed, laterally adjusting and aligning the door with respect to the outer body panel.

2. The system of claim 1 wherein the female part is secured to the pillar of the vehicle and the male part is secured to the door.

3. The system of claim 1 wherein the male part is secured to the pillar of the vehicle and the female part is secured to the door.

4. The system of claim 1 wherein the projecting portion is generally cylindrical with a generally constant diameter.

5. The system of claim 1 wherein the receptacle is generally cylindrical.

6. The system of claim 5 wherein the receptacle further includes a pocket having a tapered portion and a non-tapered portion, the non-tapered portion being sized to closely receive the projecting portion.

7. The system of claim 1 wherein the male part further includes a first mounting plate.

8. The system of claim 7 wherein the projecting portion is integral to the first mounting plate.

9. The system of claim 7 wherein the projecting portion is a separate piece attached to the first mounting plate.

10. The system of claim 1 wherein the female part further includes a second mounting plate.

11. The system of claim 10 wherein the receptacle is integral to the second mounting plate.

12. The system of claim 10 wherein the receptacle is a separate piece attached to the second mounting plate.

13. The system of claim 10, further comprising a seal between the second mounting plate and the surface to which the female part is attached.

14. The system of claim 1, further comprising a pair of male parts and a pair of female parts, the pair of parts of a first gender being attached to a surface of a pillar of the vehicle at a predetermined datum referenced to the outer body panel and the pair of parts of a second gender being attached to a surface of the door.

15. A system for aligning a slide door of a vehicle with respect to an outer panel of a body of the vehicle, comprising:
- at least one male part having a projecting portion;
- at least one corresponding female part having a receptacle, one of the parts being attached to a surface of a pillar of the vehicle at a predetermined spacial datum referenced to the outer body panel and the other of the parts being attached to a surface of the door;
- a first elongated rail attached to the body, the first rail having a longitudinal channel with a non-flared portion and a flared portion, the width of the channel of the first rail being gradually tapered between the flared portion and the non-flared portion, opposing sidewalls of the channel of the first rail being symmetrically tapered with respect to a centerline of the channel of the first rail;
- a first wheel attached to the door and rotatably movable along the channel of the first rail, the first wheel being laterally constrained in the non-flared channel portion of the first rail when the door is in an open condition and being laterally movable in the flared channel portion of the first rail when the door is proximate a closed condition;
- a second elongated rail attached to the body, the second rail having a longitudinal channel with a non-flared portion and a flared portion, the width of the channel of the second rail being gradually tapered between the flared portion and the non-flared portion, opposing sidewalls of the channel of the second rail being symmetrically tapered with respect to a centerline of the channel of the second rail; and
- a second wheel attached to the door and rotatably movable along the channel of the second rail, the second wheel being laterally constrained in the non-flared channel portion of the second rail when the door is in the open condition and being laterally movable in the flared channel portion of the second rail when the door is proximate the closed condition,
- wherein the door is laterally adjustable proximate the closed condition by lateral movement of the wheels, and wherein the projecting portion of the male part mates with the receptacle of the corresponding female part when the slide door is closed, laterally adjusting and aligning the door with respect to the outer body panel.

16. A system for aligning a slide door of a vehicle with respect to an outer panel of a body of the vehicle, comprising:

at least one male part attached to a surface of the door, the male part having a generally cylindrical projecting portion with a generally constant diameter;

at least one corresponding female part attached to a surface of a pillar of the vehicle at a predetermined spacial datum referenced to the outer body panel, the female part having a generally cylindrical receptacle and further including a pocket having a tapered portion and a non-tapered portion, the non-tapered portion being sized to closely receive the projecting portion;

a first elongated rail attached to the body, the first rail having a longitudinal channel with a non-flared portion and a flared portion, the width of the channel of the first rail being gradually tapered between the flared portion and the non-flared portion, opposing sidewalls of the channel of the first rail being symmetrically tapered with respect to a centerline of the channel of the first rail;

a first wheel attached to the door and rotatably movable along the channel of the first rail, the first wheel being laterally constrained in the non-flared channel portion of the first rail when the door is in an open condition and being laterally movable in the flared channel portion of the first rail when the door is proximate a closed condition;

a second elongated rail attached to the body, the second rail having a longitudinal channel with a non-flared portion and a flared portion, the width of the channel of the second rail being gradually tapered between the flared portion and the non-flared portion, opposing sidewalls of the channel of the second rail being symmetrically tapered with respect to a centerline of the channel of the second rail; and a second wheel attached to the door and rotatably movable along the second rail, the second wheel being laterally constrained in the non-flared channel portion of the second rail when the door is in the open condition and being laterally movable in the flared channel portion of the second rail when the door is proximate the closed condition, wherein the door is laterally adjustable proximate the closed condition by lateral movement of the wheels, and wherein the projecting portion of the male part mates with the receptacle of the corresponding female part when the slide door is closed, laterally adjusting and aligning the door with respect to the outer body panel.

17. The system of claim 16 wherein the male part further includes a first mounting plate.

18. The system of claim 17 wherein the projecting portion is integral to the first mounting plate.

19. The system of claim 16 wherein the female part further includes a second mounting plate.

20. The system of claim 19, further comprising a seal between the second mounting plate and the pillar.

* * * * *